INVENTOR.
M. LEONARD SINGER
BY
Mellew & Toren
ATTORNEYS

United States Patent Office 3,535,794
Patented Oct. 27, 1970

3,535,794
KEY MEASURING DEVICE
M. Leonard Singer, 60 Brandon Ave.,
Wayne, N.J. 07470
Filed Aug. 8, 1968, Ser. No. 751,284
Int. Cl. G01b 3/18
U.S. Cl. 33—174                         4 Claims

ABSTRACT OF THE DISCLOSURE

A key gauge comprising a micrometer mounted on a base with a reference edge and clamping plate. A key may be mounted in the clamping plate such that measurements may be taken along the longitudinal key edge with respect to the reference edge.

SUMMARY OF THE INVENTION

This invention relates in general to the construction of a measuring device for keys and in particular to a new and useful micrometer measuring device with means for clamping the key to be measured in a location so that the micrometer may be manipulated for measuring the depth of cuts, the spacing between cuts as well as the length, width and height of the key and the depth of the groovings in the key.

The present invention is an improvement over prior art devices inasmuch as there is provided a simple device for mounting a micrometer so that it may be moved into association with a key which may be clamped in one or more positions on a block member for facilitating the measuring of various critical dimensions thereof. The block member advantageously includes a measuring plate which is carried on one end and which provides a surface against which the key may be positioned for the purpose of measuring the depth of spacing between bitings of the teeth or, for example, the depth of the key groove. For this purpose the plate is advantageously made of a thickness such that its edge will normally fit into each of the grooves of the standard keys so that the key may be pressed against the plate at the location of the groove to measure the depth of the groove from the opposite face. In a similar manner the depth of the cuts along the key and the dimension of the projections or teeth along the key may be easily measured or an indication of a desirable depth made in a simple manner. The micrometer is mounted so that it may be advanced or retracted in respect to a measuring plate disposed at the opposite end of a block against which the key may be clamped. The micrometer bolt may be advanced in its indicating cylinder along the length of the key for indicating various critical length dimensions or the key may be shifted flat against the end plate for measuring the key thickness or the depth of the key groovings.

Accordingly it is an object of the invention to provide a simple device for measuring various critical dimensions of keys.

A further object of the invention is to provide a device which includes a micrometer mounted so that its micrometer measuring bar may be advanced or retracted in respect to a measuring plate alongside which a key may be clamped.

A further object of the invention is to provide a micrometer measuring device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION

Figure 1:
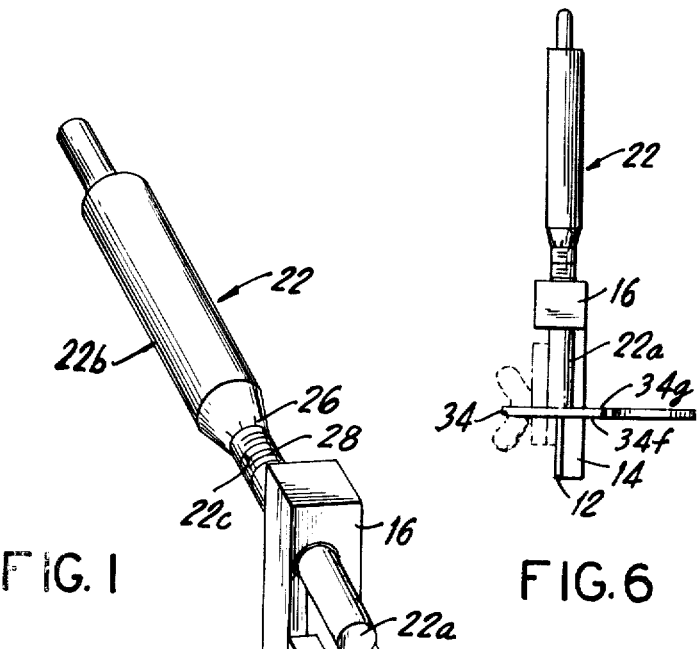
FIG. 1 is a front side perspective view of a key measuring device constructed in accordance with the invention.

Referring to the drawings in particular, the invention embodied therein comprises a measuring device generally designated 10 which includes a measuring plate or guide plate 12 affixed to one end of a block 14 in a manner such that its upper portion extends above a top surface 14a thereof. The opposite end of the block 14 carries a support or pedestal 16 which projects above the surface 14a and rotatably supports a micrometer measuring bar or cylinder 22a of a micrometer assembly generally designated 22. The micrometer 22 includes the usual main cylinder portion 22b having a scale 26 and a supporting cylinder portion 22c with indications 28. The supporting cylinder portion 22c having indications 28 is carried in the pedestal 16 and it rotatably carries the bar 22a.

In accordance with the invention, the block carries a clamping plate 30 which may be tightened against the block 14 by means of a clamping screw 32. The plate 30 is used for clamping a key 34 such that the longitudinal axis of its shank portion 34a extends parallel to the edge of the block 14 between the measuring plate 12 and the pedestal 16.

Figures 2, 4:
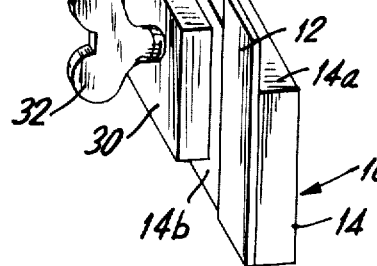
FIG. 2 is a top plan view of the measuring device on a slightly smaller scale and showing the key in a clamped position.
FIG. 4 is a top plan view on a reduced scale indicating the key in a position for measuring the depth of cuts.

As indicated in FIG. 2, when it is desired to measure a length dimension, the key is oriented so that its side is flush against the block 14 and it is clamped against the surface 14b by the plate 30. In FIG. 2 the distance from a key shoulder stop 34b to a first tooth 34c may be measured as indicated by the dimension A.

Figure 3:
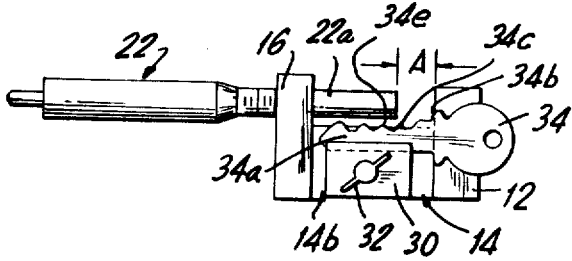
FIG. 3 is a side elevational view on a reduced scale indicating the key in a position for measuring the length of the key shank from the shoulder stop to the end.

In FIG. 3 the total length B of the shank portion from the shoulde 34b to the tip 34d of the key is measured with the key 34 in the same position.

Figures 5, 6:
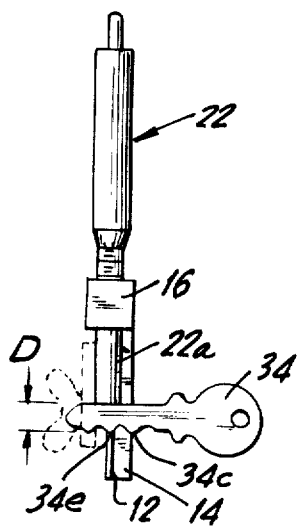
FIG. 5 is a top plan view on a reduced scale indicating the key in a position for measuring the tooth portions.
FIG. 6 is a top plan view on a reduced scale of the device indicating the key in a position for measuring the thickness thereof.

As indicated in FIG. 4, it is also possible to measure a cross dimension, for example the depth of cut between the first two teeth 34c and 34e. For this measurement the measuring plate 12 is oriented so that it engages within the spacing between the teeth 34c and 34e and the micrometer bar 22a is advanced until its end flat surface engages against an edge 34f of the key 34. This effects measurement of the dimension C indicated in FIG. 4. To find the depth of cut, a measurement to obtain the dimension D is made with the key in the position as indicated in FIG. 5 at which the edge of the tooth 34e is engaged with the edge of the plate 12. The depth of cut is substantially equal to the difference in the dimension D and C.

The key may also be oriented so that its side 34g is oriented flush against the edge of the measuring plate 12 and the micrometer bar 22a is advanced to contact the opposite side 34f. This position may be assumed for measuring the thickness of the key. When it is desired to measure the depth of the groove or grooves of the key, then the key is oriented so that its tip faces downwardly against the surface 14a and the edge of the plate 12 is oriented within the groove to be measured. The bar 22a is then advanced until it hits the surface which does not have the groove therein and the indication thus obtained can be subtracted from the dimension achieved by the measurement obtained in the position of FIG. 6 to obtain the depth of groove which has been cut into the key.

A further advantage of the device of the invention is that it may be used to effect cutting of the key to specified dimensions. The micrometer bar 22a may be located to the read-out dimension and an inscription made on the key shank portion in order to show the necessary dimension of cut with the required spacing between teeth. Thus the device is capable of measuring all depths of cuts or bitings of all types of keys. In addition, it may measure the spacing between cuts of the keys and measure the spacing between the shoulder stop and the first cut of the key. All dimensions, including length, width and height and depth of key groovings may be easily obtained. The device also provides a mechanical holder or guide which permits the use of a scriber to mark the position of a cut or biting on a blank key at designated locations.

While a specific embodiment of the invention has been shown and described in detail to illustrate the application of the inventive principles, it will be understood that the invention may be embodied otherwise without departing from such principles.

What is claimed is:

1. A device for measuring key dimensions comprising a rectangular block member, a micrometer pedestal adjacent to one end of said block member, a measuring plate adjacent to said block member and spaced from said micrometer pedestal and having a relatively thin reference edge, a micrometer mounted on said pedestal and having a measuring bar movable toward and away from said reference edge, said block member having a block face parallel to the direction of motion of said measuring bar, said reference edge being perpendicular to and intersecting said direction of motion, and means for clamping comprising a plate and a mounting means for said plate permitting motion toward and way from said block face parallel to the direction of motion of said measuring bar, said clamping means permitting a key to be held in a position against said block face so that its longitudinal edge is aligned along said direction of motion of said measuring bar, said measuring bar being movable toward and away from said reference edge for measuring distances along the length of said key.

2. A device according to claim 1, wherein said block has a top surface against which the key may be oriented with its side face against said reference edge for the purpose of measuring a thickness dimension of said key.

3. A device according to claim 1, wherein said reference edge is thin enough to fit into said groove of a key.

4. A device according to laim 1, wherein said clamping means includes a plate threaded onto a threaded clamping screw, said threaded clamping screw being threaded into said block face.

References Cited
UNITED STATES PATENTS

| | | |
|---|---|---|
| 1,250,999 | 12/1917 | Ettinger. |
| 1,279,384 | 9/1918 | Lurie. |
| 2,021,201 | 11/1935 | Ross. |
| 2,069,563 | 2/1937 | Segal. |

LEONARD FORMAN, Primary Examiner

D. A. DEARING, Assistant Examiner

U.S. Cl. X.R.

33—167